United States Patent [19]

Kalwaites et al.

[11] 4,013,752
[45] Mar. 22, 1977

[54] METHOD OF MANUFACTURING RETICULATE SHEET MATERIAL

[75] Inventors: Frank Kalwaites, Somerville; Peter L. Doviak, South Brunswick, both of N.J.

[73] Assignee: Johnson & Johnson, New Brunswick, N.J.

[22] Filed: Feb. 9, 1972

[21] Appl. No.: 182,561

Related U.S. Application Data

[62] Division of Ser. No. 54,961, July 15, 1970, Pat. No. 3,666,609.

[52] U.S. Cl. .................. 264/154; 264/167; 264/289; 264/293; 264/DIG. 47; 264/DIG. 81
[51] Int. Cl.² .................. B28B 1/48; D01D 5/20
[58] Field of Search .......... 161/109, 177; 264/289, 264/293, 154, 167, 73, DIG. 47, DIG. 81

[56] References Cited

UNITED STATES PATENTS

| | | | |
|---|---|---|---|
| 3,137,746 | 6/1964 | Seymour et al. | 264/289 |
| 3,365,352 | 1/1968 | Burleigh et al. | 161/109 |
| 3,384,530 | 5/1968 | Mercer et al. | 161/109 |
| 3,386,876 | 6/1968 | Wyckoff | 161/109 |
| 3,387,077 | 6/1968 | Sammons et al. | 161/109 |
| 3,441,638 | 4/1969 | Patchell et al. | 161/109 |
| 3,500,627 | 3/1970 | Kim | 161/177 |
| 3,505,157 | 4/1970 | Fields et al. | 161/109 |
| 3,554,853 | 1/1971 | Mercer et al. | 161/109 |
| 3,632,716 | 1/1972 | Fairbanks | 264/145 |
| 3,642,967 | 2/1972 | Doll | 161/109 |

Primary Examiner—Jay H. Woo

[57] ABSTRACT

A method of manufacturing a reticulate polymer sheet having a set of filaments extending across the sheet and intersecting in molecularly oriented integral junctures with a second set of filaments comprising stretching a net-like structure in the longitudinal direction at least 3 to 1 and in the transverse direction at least 4 to 1 to provide a total stretch of from 12 to 1 to 40 to 1 to substantially uniformly molecularly orient the entire sheet.

7 Claims, 11 Drawing Figures

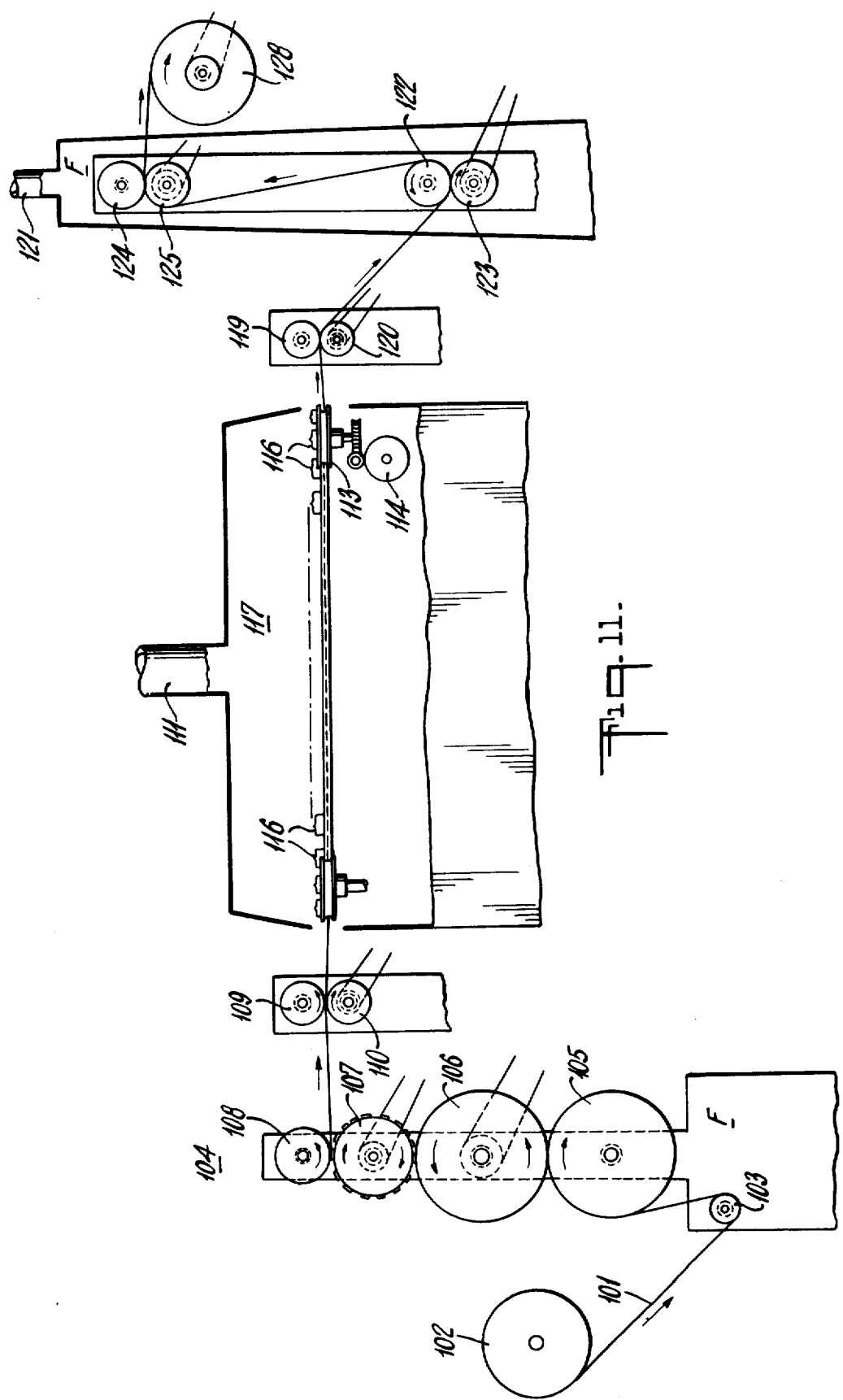

4,013,752

METHOD OF MANUFACTURING RETICULATE SHEET MATERIAL

BACKGROUND OF THE INVENTION

This is a divisional application of our co-pending application Ser. No. 54,961 filed July 15, 1970 now U.S. Pat. No. 3,666,609.

This invention relates to new and improved methods for manufacturing reticulated or net-like sheet materials of synthetic polymers. Oriented and unoriented reticulated or net-like materials made from synthetic polymers such as the polyolefins and specifically polypropylene have become increasingly important for various end uses. The unoriented materials have found substantial use in the packaging and decorative industries. The molecularly oriented materials have found substantial use as substitutes for woven fabrics and as reinforcements for nonwoven fabrics, paper and the like.

The molecularly oriented net-like materials are, for the most part, used to provide strength and support, for example, as reinforcing means for generally weak fabrics. Molecular orientation of the net-like polymer material greatly improves its strength. The very lightweight net materials which have been highly oriented provide a product which has a high strength to weight ratio. Such products may be incorporated between lightweight layers of fibers or paper to provide good strength without harming the desirable properties of the fibers or paper to which it is laminated.

The terms "oriented" or "orientation" as used throughout this specification, mean "molecularly oriented" or "molecular orientation."

A major problem with the oriented net-like materials is associated with the area where the filaments intersect with each other, that is, form the junctures. In those net-like products, where the filaments are integral at the intersection, that is, the juncture of filaments and the filaments themselves lie in substantially the same plane and do not possess any readily detectable physical boundaries, the degree of orientation at the junctures is low and hence, the junctures are weak. This weakness can be overcome to some extent by increasing the amount of polymer at the juncture or intersection, however, this produces nubs at the intersection, takes away from other desirable properties of the material and reduces the strength to weight ratio of the material.

Some net-like products are made by laminating two sets of filaments or by extruding continuous filaments and bonding or adhering these filaments at their cross-over points. This adhering may be accomplished by adding an adhesive to the cross-over points or by softening the filaments so they adhere to each other at their cross-over points. By these techniques a continuous filament can be oriented substantially uniformly along its entire length so that the junctures are highly oriented. However, such a juncture is not integral and the weakest portions of the material are the regions of adherence between the crossing filaments. Furthermore, the cross-over points are of a double thickness and produce high spots in the final fabrics when used as a reinforcing means.

Net-like materials produced by extruding crossing filaments so that they are adhered at their cross-over points in the unoriented stage and then orienting these filaments are not sufficiently oriented at the junctures and produce nubs or high spots in the final reinforced fabric.

SUMMARY OF THE INVENTION

We have discovered a new and improved net-like product which overcomes these problems. In our new product the junctures are in the same plane as the filaments which intersect to form the junctures and hence, our product does not have high spots or nubs which detract from the desirable properties of the final product when used as a reinforcing means. Unexpectedly, both the junctures and the filaments are highly molecularly oriented and our new product has excellent strength to weight ratios.

Our new product is a reticulate polymer sheet having a first set of filaments extending across the sheet and intersecting in molecularly oriented junctures with a second set of filaments. Each juncture is bounded by smaller filaments formed by the division of the filaments of the first and second sets.

In accordance with the present invention our new product is made by forming a net-like structure of unoriented ribs and junctures which define a pattern of openings therebetween. The net-like structure is stretched in the longitudinal direction at a ratio of at least 3 to 1 and in the transverse direction at a ratio of at least 4 to 1 to provide a total stretch of from 12 to 1 to 40 to 1 whereby the ribs and junctures are substantially uniformly oriented throughout the sheet.

BRIEF DESCRIPTION OF THE DRAWINGS

The invention will be more fully described when taken in conjunction with the accompanying drawings wherein:

FIG. 11 is a schematic view in elevation of a method for producing the reticulated sheet material according to the present invention.

DETAILED DESCRIPTION OF THE DRAWINGS

Figure 1:
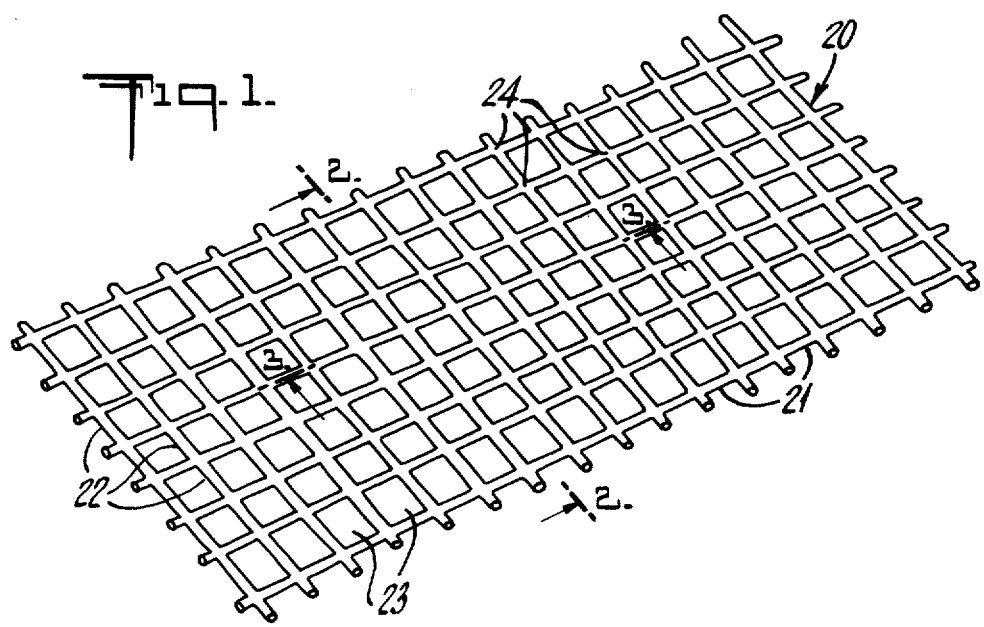
FIG. 1 is a view in perspective of the improved reticulated sheet material produced according to the present invention.
Figure 2:
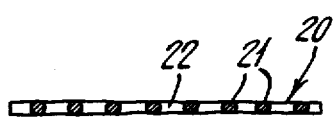
FIG. 2 is a cross-sectional view taken along line 2—2 of FIG. 1.
Figure 3:
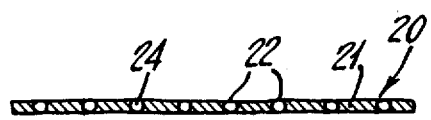
FIG. 3 is a cross-sectional view taken along line 3—3 of FIG. 1.

Referring to the drawings in FIG. 1, there is shown a reticulated sheet material 20 of the present invention. The material comprises continuous filaments 21 extending in one direction and continuous filaments 22 which extend at substantially right angles to the filaments 21 to form rectangular or square openings 23 between the filaments. The filaments intersect at junctures 24 and these intersections are integral and substantially in the plane of the fabric. The filaments 21, extending in the longitudinal direction of the fabric between intersections, are highly molecularly oriented and the filaments 22, extending in the transverse direction of the fabric between intersections, are also highly molecularly oriented, while the juncture or intersection 24 itself is molecularly oriented at least 75% of the molecular orientation of the filaments. As is more clearly seen in FIGS. 2 and 3, which are cross-sectional figures, of the material of FIG. 1, the longitudinal filaments 21 and the transverse filaments 22 and the junctures 24 are all in the same plane.

Figure 4:
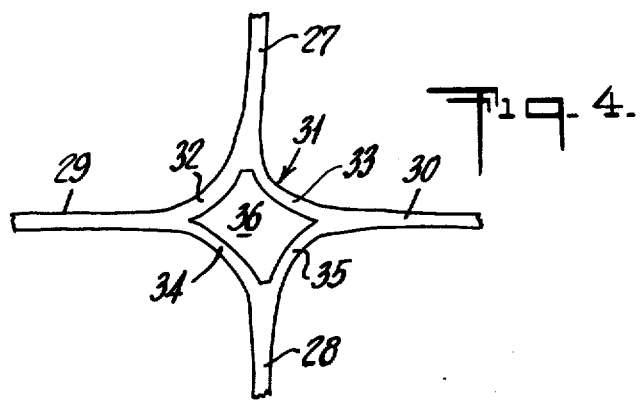
FIG. 4 is an enlarged plan view of one of the intersections of the sheet material shown in FIG. 1.
Figure 5:
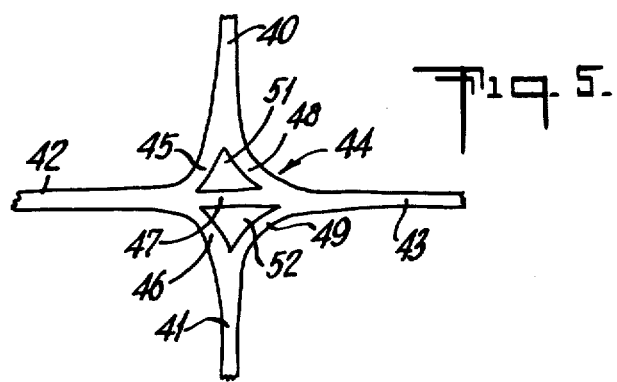
FIG. 5 is an enlarged plan view of an intersection of another embodiment of the reticulated sheet material produced according to the present invention.
Figure 6:
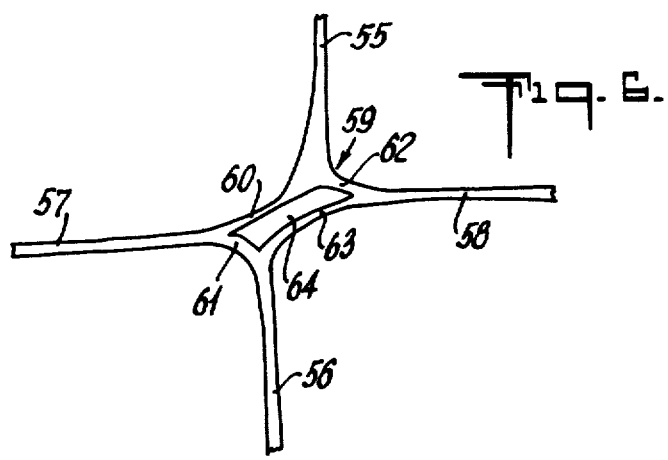
FIG. 6 is an enlarged plan view of an intersection of another embodiment of the reticulated sheet material.

Referring to FIGS. 4, 5 and 6, there are shown three various embodiments in enlarged plan views, of three types of junctures or intersections of the reticulated sheet material of the present invention.

In FIG. 4, a pair of longitudinal filaments 27 and 28 and a pair of transverse filaments 29 and 30 enter the juncture 31. The longitudinal filament 27 splits into a pair of smaller filaments 32 and 33 which merge into the transverse filaments 29 and 30. The longitudinal filament 28 also splits into a pair of smaller filaments 34 and 35 which merge into the transverse filaments 29 and 30. The smaller filaments 32, 33, 34 and 35 are highly oriented and bound an area 36 which is a highly oriented thin film. The film area is uniaxially oriented with the direction of orientation changing over the area 36. It is theorized that a reason for the excellent strength of my new product is that when stress is placed on the transverse filaments 29 and 30, the film area orientation is also transverse; however, when stress is placed on the longitudinal filaments, 27 and 28, the molecules in the film area 36 reorient themselves to a certain degree in the longitudinal direction.

Referring to FIG. 5, there is shown an intersection of a reticulated sheet material of the present invention comprising a pair of longitudinal filaments 40 and 41 and a pair of transverse filaments 42 and 43 which meet at juncture 44. The transverse filament 42 as it enters the juncture, divides into three smaller filaments 45, 46, and 47. Filaments 45 and 46 diverge at substantially right angles and merge into the longitudinal filaments 40 and 41. The other filament 47 containues straight across the juncture into the transverse filament 43. The opposed transverse filament 43 also splits into three smaller filaments 48, 49, and 47. Filaments 48 and 49 diverge at substantially right angles and merge into the longitudinal filaments 40 and 41. Filament 47 continues across the juncture to merge with the transverse filament 42. All of the filaments are highly uniaxially oriented. The filaments form two triangular shaped areas 51 and 52. These areas are covered by a thin film which is also highly uniaxially oriented and aid in taking up any stresses placed on the juncture.

In FIG. 6, there is shown another type of juncture which may be present in the materials of the present invention. In this juncture a pair of longitudinal filaments 55 and 56 and a pair of transverse filaments 57 and 58 merge into a juncture 59. The transverse filament 57 divides into two smaller oriented filaments 60 and 61. One of the filaments 60 takes a smooth curve into longitudinal filament 55 and the other filament 61 takes a more pronounced curve, at substantially 90°, into the other longitudinal filament 56. The other transverse filament 58 also splits into a pair of smaller filaments 62 and 63 which follow a similar path and merge into the longitudinal filaments 55 and 56. All of the filaments are highly oriented and filaments 60, 61, 62, 63 bound a thin film area 64 which is uniaxially oriented.

Figure 7:
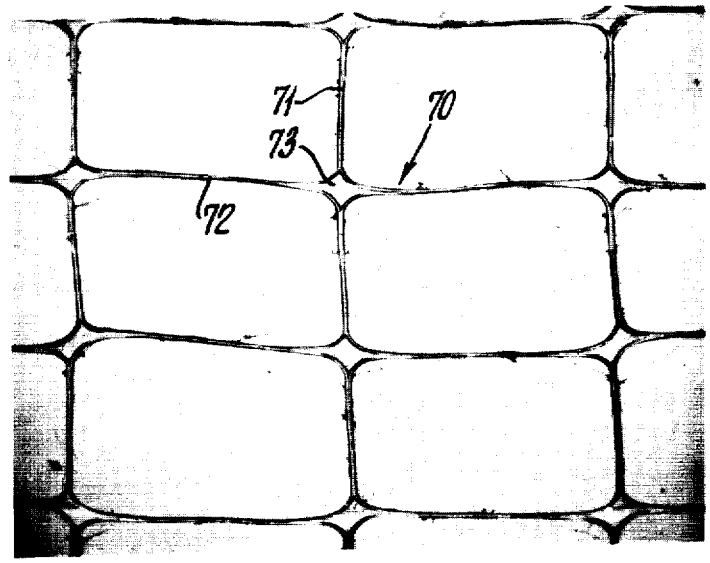
FIG. 7 is a photomicrograph of a reticulated sheet material produced according to the present invention at an original enlargement of 5 times.
Figure 8:
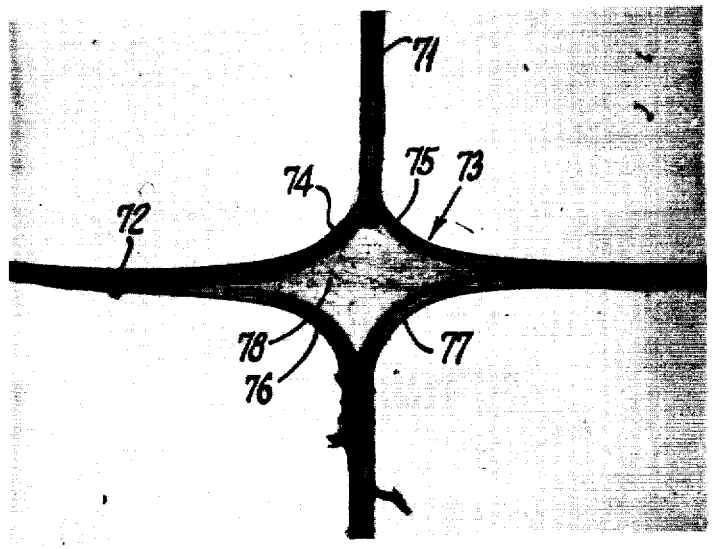
FIG. 8 is a photomicrograph of an intersection of the reticulated sheet material shown in FIG. 7 at an original enlargement of 20 times.

In FIG. 7, there is shown a photomicrograph of a reticulated sheet material of the present invention. The material 70 comprises longitudinal filaments 71 and transverse filaments 72. The filaments meet at junctures 73. As may be more clearly seen in FIG. 8, which is an enlargement of one of the junctures shown in FIG. 7, a longitudinal filament 71 splits into a pair of filaments 74 and 75 which merge into transverse filament 72. A diametrically opposed longitudinal filament 71 also splits into two smaller filaments 76 and 77 which merge into transverse filament 72 to form the juncture 73. The center of the juncture is covered with a thin film area 78 which is uniaxially oriented. The longitudinal and transverse filaments are highly molecularly oriented and are uniaxially oriented. The smaller filaments 74, 75, 76, 77 which form a part of the juncture are highly molecularly oriented and are uniaxially oriented.

Figure 9:
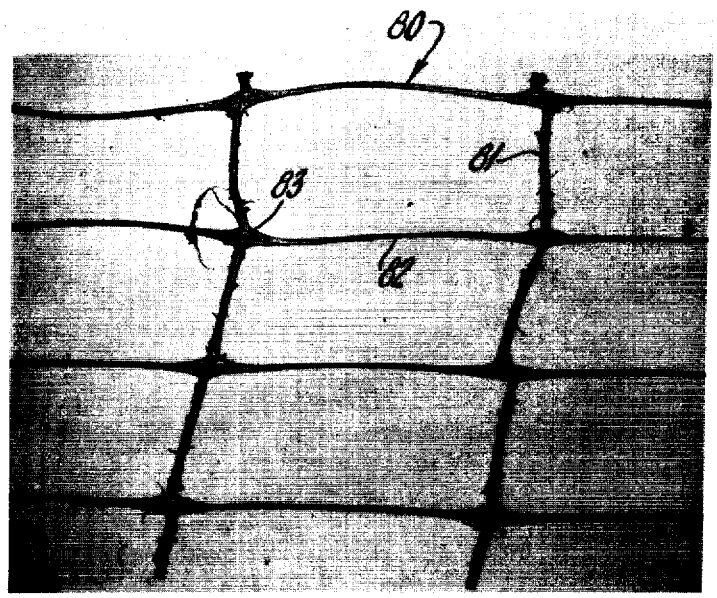
FIG. 9 is a photomicrograph of another embodiment of the reticulated sheet material at an original enlargement of 5 times.
Figure 10:
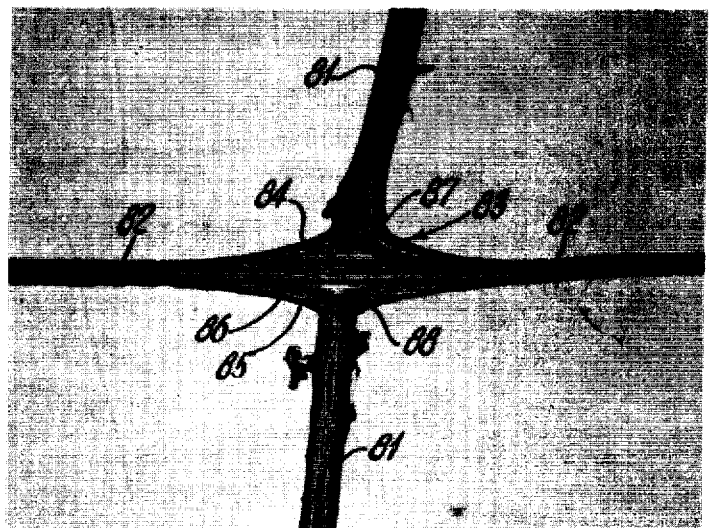
FIG. 10 is a photomicrograph of an intersection of the reticulated sheet material shown in FIG. 9 at an original enlargement of 20 times.

Referring to the photomicrograph shown in FIG. 9 there is shown another embodiment of the reticulated sheet material of the present invention. The sheet material 80 comprises longitudinal filament 81 and transverse filaments 82 which meet at junctures 83. FIG. 10 is an enlarged photomicrograph of one of these junctures. A transverse filament 82, as it enters the juncture, splits into three filaments 84, 85, and 86. The filaments 84 and 85 merge into the longitudinal filament 81 which also enter the juncture and filament 86 extends across the juncture to the other transverse filament 82 which also enters the juncture. The triangular shaped areas 87 and 88, in the juncture 83, are thin films which are uniaxially oriented. The longitudinal and transverse filaments 81 and 82 are uniaxially oriented and have a high degree of orientation. The filaments 84, 85, and 86, which form a part of the juncture 83, are uniaxially oriented and have a high degree of orientation.

The starting materials which may be used to produce the reticulated sheet materials of the present invention are any of the readily molecular 14 orientable synthetic polymers; such as the polyolefins, polyesters, polyamides, etc. The preferred starting materials are the polyolefins because of cost and ease of handling. Very suitable materials for producing the products of the present invention are isotactic polypropylene and high density polyethylene.

The starting material is a film which has a pattern of discontinuous thin or open areas uniformly distributed over its surface. The open areas may be formed by embossing or perforating the film or by casting the film in the desired pattern. The openings may have various shapes such as circular, square, rectangular, trapazoidal, etc. The openings may be aligned longitudinally and transversely of the film or they may be staggered in a diamond pattern as desired.

The openings are bounded by polymer portions, hereinafter referred to as ribs, which are oval or circular in cross-sections and have substantially the shape of filaments. These ribs intersect at junctures and each juncture should have an even number of such ribs extending from it and must have at least 4 ribs extending from the juncture. The length of an individual rib must be greater than its diameter and the thickness or cross-sectional area of the rib should be substantially the same as the thickness or cross-sectional area at the juncture of the ribs. Another way of saying this is that there should not be an excessive mass of the polymer at the juncture. The pattern sheet material is stretched in the longitudinal and transverse directions to orient it. The stretching in both the longitudinal and transverse directions should be at least 3 to 4 to 1 and preferably at least 4 to 1. The stretching ratio may be as much as 6 to 10 to 1 in each direction. Generally, the material will be capable of being stretched a greater amount in the transverse direction than in the longitudinal direction; for example, if the maximum stretch in the transverse direction is 10 to 1, the maximum stretch in the longitudinal direction may be 6 to 1. If desired, the orientation or stretching operation of the patterned film may be accomplished at elevated temperatures, that is, temperatures of from 270° F. to 320° F. depending on the base polymer used.

By orientation, it is meant the structural arrangement or alignment of the molecules in a crystalline polymer in that portion of the film or material being described.

Generally, molecular orientation in crystalline polymers can be measured by x-ray diffraction methods involving an appropriately selected set of crystallographic planes, however because the preferred reticulated sheet material of the present invention is a monoclinic crystalline polymer, such measurements are not possible. However, in such instances, orientation measurements may be made by measurements of diffraction from two sets of diffracting planes containing the c axis; the c axis being the fiber axis of the polymer.

A quantitative method of determining an average fiber axis orientation is expressed in terms of the average square cosine of the angle between the c axis and a chosen reference direction and is called the orientation function which may be defined by the following formula:

$$f_c = \frac{3 \langle\cos^2 \theta\rangle - 1}{2}$$

The direction and validity of the above formula is more fully described and discussed in an article by Z. W. Wilchinksy, *Journal of Applied Physics*, Volume 31, Number 11, pp. 1969 to 1972, November 1960.

If the products of the present invention are made from polymers, the molecular orientation of which can be determined by standard x-ray diffraction techniques, such should be done. The $\theta$ value obtained should then be used in the above formula to determine the orientation function of such polymers.

In the reticulate sheet material of the present invention, the filaments between junctures are uniaxially oriented and have a molecular orientation function of at least 0.75, and preferably have a molecular orientation function of at least 0.8. The filaments may have a maximum molecular orientation function of 1. In some instances, the filaments extending in one direction may be oriented more or less than the filaments extending in the other direction. The junctures, which are integral with the filaments, have a molecular orientation of at least 75% of the orientation of the filaments between intersections. Preferably, these junctures have an orientation of at least about 85% of the orientation of the filaments between the intersections. The junctures are uniaxially oriented and preferably have a molecular orientation function of from 0.7 to 0.8 or higher.

One of the methods for producing the sheet material of the present invention is shown schematically in FIG. 11. A supply of film 102 is fed from a supply roll about an idler roll 103 through the forming unit 104 mounted in suitable framing F. The forming unit comprises a first roll 105 for controlling the feed to and around the second roll 106 which is heated by any of the standard heating means. The film is heated by passing about a portion of the periphery of roll 106 and is formed by forming roll 107 in contact with the heated roll 106. The forming roll 107 is engraved with the pattern desired to be formed in the film. After the film is formed, it passes between the nip formed by the idler roll 108 and the forming roll and is allowed to cool. The cooled material passes to a pair of nip rolls 109 and 110 and is fed into a transverse stretching mechanism 111. In this instance, a tenter frame is used which comprises a pair of diverging chain conveyors 112 mounted on suitable pulleys 113. The chain conveyors are driven by a suitable drive mechanism 114. The material enters from the left hand side of the tenter frame where the chains are at their closest point. The material is gripped along its edges by tenter clips 116 and the material conveyed through the tenter frame as the chains diverge spreading the material in a transverse direction. This entire system is heated by a suitable oven 117 to maintain the material at the desired temperature through the transverse stretching operation. The film passes from the tenter frame to a pair of nip rolls 119 and 120 for control and to a longitudinal stretching device 121. The longitudinal stretching device is a standard mechanism and comprises two sets of nip rolls. The bottom pair of rolls 122 and 123 are mounted for rotation in framing F with the bottom roll 123 of this pair being driven. The top pair of rolls 124 and 125 are also mounted for rotation in the frame with the bottom roll 125 of this pair also driven. The top pair of rolls are driven at a faster peripheral linear speed than the bottom pair of rolls and the speed may be adjusted to produce the desired longitudinal stretching for orientation of the material. Transverse stretching ratios of from about 4:1 to 11:1 or higher have been found satisfactory and longitudinal stretching ratios of from 3:1 to 11:1 or even higher have been found satisfactory. During the longitudinal stretching, the net may also be heated by a suitable oven 127 in order to longitudinally stretch the material. After the stretching operation the oriented net is wound on a standard wind-up mechanism 128 mounted in suitable framing.

As previously mentioned, the starting material may be any of the orientable synthetic polymers. The starting material should be softenable at elevated temperatures but have thermal stability and resist oxidation or other degradation at the elevated temperatures. The material should solidify rapidly and be fiber forming and it should melt and crystallize over a narrow temperature range.

When stretching the material after it is patterned, the total stretch should be in the range of 12:1 to 40:1; i.e., the product of the longitudinal and transverse stretches should be in this range. The longitudinal stretch may vary from about 3:1 to 6:1 with the preferred ratio about 3.6:1. The transverse stretch may vary from about 4:1 to 10:1 with the preferred ratio about 8:1. For ease of processing, it is preferred that the material be stretched in the longitudinal direction and then in the transverse direction.

The pattern in the net to be stretched should be such that each filament entering a juncture has a diametrically opposed filament so that when the net is stretched it does so uniformly. Also, the cross-sectional area throughout the net should be substantially constant so that stress is applied to the net uniformly during the stretching operation. Furthermore, material should extend continuously across the net so that stresses placed on the net during the stretching operation do not have to make an abrupt change in direction or stop at one point in the net and start at a second spaced-apart point in the net.

The invention will be further illustrated in detail by the following specific examples. It should be understood, however, that although these examples may describe in particular detail some of the more specific features of the invention, they are given primarily for the purposes of illustration and the invention in its broader aspects is not to be construed as limited thereto.

EXAMPLE I

An isotactic polypropylene film having a thickness of about 8 mils and a melt index of 4 is heated to a temperature of about 280° F. by a heated roll such as is shown in FIG. 11 which is at a temperature of 340° F. The film is formed in a pattern to produce a reticulate sheet material with 10 openings per inch running in the longitudinal direction and 23 openings per inch running in the transverse direction. The film is cooled at 220° F. and removed from the forming roll. The patterned film is stretched in the transverse direction at a ratio of 7:1 and in the longitudinal directon at a ratio of 4:1. The resultant oriented film has a tensile strength in the longitudinal direction of 0.69 pounds and in the cross direction of 0.3 pounds.

The molecular orientation function of the various portions of the filaments is measured as described in the Wilchinksy reference previously mentioned.

$$f_c = \frac{3 \langle \cos^2 \theta \rangle - 1}{2}$$

The molecular orientation function in the longitudinal direction filament between intersections is 0.80 plus or minus 0.04, and in the cross-direction filaments are also 0.80 plus or minus 0.04. The junctures of this reticulated sheet material are similar to those shown in FIG. 7. The molecular orientation function at the edge of the juncture that is the heavy portion, is 0.75 plus or minus 0.04 whereas the molecular orientation function in the center of the juncture is 0.70 plus or minus 0.04. The reticulate sheet material is highly molecularly oriented in all of the various portions, that is, both filaments and junctures.

EXAMPLES II

A high density polyethylene film having a thickness of about 6 mils, a density of 0.940 to 0.965 g/cm³, a melting point of 275° F., and a refractive index of 1.54, is heated by a heated roll such as is shown in FIG. 11 which is at a temperature of 340° F. The film is formed in a pattern to produce a reticulate sheet material with 20 openings per inch running in the longitudinal direction and 17 openings per inch running in the transverse direction. The film is cooled at 200° F. and removed from the forming roll. The patterned film is stretched in the transverse direction at a ratio of 7:1 and in the longitudinal direction at a ratio of 3:1.

The molecular orientation of the filaments and junctures of the resulting product are measured using standard x-ray diffraction techniques and the molecular orientation function determined using the previously described formula. The results obtained are similar to those obtained in Example I.

EXAMPLE III

A polycaprolactam (nylon 6) film having a thickness of about 8 mils, density of 1.12 to 1.15 g/cm³, a melting point of 425° F. and a refractive index of 1.53, and a melt index of 4 is heated by a heated roll such as is shown in FIG. 11 which is at a temperature of 440° F. The film is formed in a pattern to produce a reticulate sheet material with 40 openings per inch running in the longitudinal direction and 30 openings per inch running in the transverse direction. The film is cooled and removed from the forming roll. The patterned film is stretched in the transverse direction at a ratio of 6:1 and in the longitudinal direction at a ratio of 3:1.

The molecular orientation of the filaments and junctures of the resulting product are measured as described in conjunction with Example II and similar results obtained.

It should be further understood that the above examples are for purposes of illustration only and are not to be used to delineate or limit the scope of the invention. The invention is only limited by the scope of the claims appended hereto.

What is claimed is:

1. A method for manufacturing a reticulate, polymer, sheet having a set of filaments extending across the sheet and intersecting in molecularly oriented integral junctures with a second set of filaments comprising:
   1. Heating a film of molecularly orientable, thermally stable, oxidation resistant synthetic polymer;
   2. Embossing said heated film to form a net like structure of substantially unoriented ribs and junctures which define a uniform pattern of openings throughout the structure, said ribs and junctures having substantially uniform cross-sectional areas throughout the structure; and
   3. Stretching the embossed film in the longitudinal direction at a ratio of at least 3:1 and in the transverse direction at a ratio of at least 4:1 so that the total area stretch of the structure is from 12:1 to 40:1, whereby the ribs and junctures are substantially uniformly molecularly oriented throughout said sheet.

2. The method according to claim 1 wherein the embossed film is stretched in the longitudinal direction at a ratio of at least 4:1.

3. A method according to claim 1 wherein the embossed film is stretched in the longitudinal direction at a ratio of at least 3.6:1 and in the transverse direction at a ratio of at least 8:1.

4. A method according to claim 1 wherein the embossed film is initially stretched in the longitudinal direction.

5. A method according to claim 1 wherein the polymer is isotactic polypropylene.

6. A method according to claim 1 wherein the polymer is high density polyethylene.

7. A method according to claim 1 wherein the polymer is polycaprolactam.

* * * * *